US009306955B2

United States Patent
Luo et al.

(10) Patent No.: US 9,306,955 B2
(45) Date of Patent: *Apr. 5, 2016

(54) EARLY POLICY EVALUATION OF MULTIPHASE ATTRIBUTES IN HIGH-PERFORMANCE FIREWALLS

(71) Applicant: Cisco Technology, Inc., San Jose, CA (US)

(72) Inventors: Haiyan Luo, Austin, TX (US); Hari Shankar, San Jose, CA (US); Daryl Odnert, Los Altos, CA (US); Niranjan Koduri, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,743

(22) Filed: Jun. 29, 2015

(65) Prior Publication Data

US 2015/0304340 A1     Oct. 22, 2015

Related U.S. Application Data

(63) Continuation of application No. 13/613,829, filed on Sep. 13, 2012, now Pat. No. 9,100,366.

(51) Int. Cl.
*H04L 29/06*     (2006.01)
*G06F 21/55*     (2013.01)
*G06F 21/62*     (2013.01)

(52) U.S. Cl.
CPC ............ *H04L 63/105* (2013.01); *G06F 21/552* (2013.01); *G06F 21/6218* (2013.01); *H04L 63/0227* (2013.01); *H04L 63/0281* (2013.01)

(58) Field of Classification Search
CPC ............ H04L 63/0227; H04L 63/0236; H04L 63/0245; H04L 63/0254; H04L 63/0263; H04L 63/0281; H04L 63/029; G06F 21/6218
See application file for complete search history.

(56) References Cited

U.S. PATENT DOCUMENTS

| | | | | |
|---|---|---|---|---|
| 6,131,163 | A | * | 10/2000 | Wiegel ............................. 726/12 |
| 6,484,261 | B1 | | 11/2002 | Wiegel |
| 7,584,262 | B1 | | 9/2009 | Wang et al. |
| 7,873,734 | B1 | | 1/2011 | Eidelman et al. |
| 7,921,459 | B2 | * | 4/2011 | Houston et al. .................. 726/22 |

(Continued)

FOREIGN PATENT DOCUMENTS

WO     2010033129 A1     3/2010

OTHER PUBLICATIONS

Yuan, et al., "Fireman: A Toolkit for FIREwall Modeling and ANalysis," Proceedings of the 2006 IEEE Symposium on Security and Privacy (S&P'06), 2006, pp. 1-15.

(Continued)

*Primary Examiner* — Eleni Shiferaw
*Assistant Examiner* — Nelson Giddins
(74) *Attorney, Agent, or Firm* — Edell, Shapiro & Finnan, LLC

(57) ABSTRACT

A policy is established comprising a condition having a multiphase attribute of a multiphase transaction. Phase specific policies are established for each phase in which the multiphase attribute may become known. The multiphase transaction is evaluated according to the phase specific policies at each phase of the multiphase transaction in which the multiphase attribute may become known until a policy decision of the policy is determined.

20 Claims, 6 Drawing Sheets

(56) References Cited

U.S. PATENT DOCUMENTS

| | | | |
|---|---|---|---|
| 7,921,460 B1* | 4/2011 | Callon et al. | 726/22 |
| 7,925,592 B1* | 4/2011 | Issa et al. | 705/59 |
| 7,966,643 B2 | 6/2011 | Nagampalli et al. | |
| 8,176,561 B1 | 5/2012 | Hurst et al. | |
| 8,725,746 B2 | 5/2014 | Yang et al. | |
| 2003/0079031 A1 | 4/2003 | Nagano | |
| 2003/0145226 A1* | 7/2003 | Bruton et al. | 713/201 |
| 2004/0054696 A1* | 3/2004 | Sheinis et al. | 707/201 |
| 2004/0268150 A1* | 12/2004 | Aaron | 713/201 |
| 2005/0015471 A1 | 1/2005 | Zhang et al. | |
| 2006/0026674 A1 | 2/2006 | Ward | |
| 2006/0031443 A1* | 2/2006 | Carpenter et al. | 709/223 |
| 2006/0143699 A1* | 6/2006 | Nagata et al. | 726/11 |
| 2006/0161966 A1 | 7/2006 | Nagampalli et al. | |
| 2006/0282877 A1 | 12/2006 | Goh et al. | |
| 2006/0294366 A1 | 12/2006 | Nadalin et al. | |
| 2007/0180526 A1 | 8/2007 | Copeland, III | |
| 2007/0198292 A1* | 8/2007 | Ash et al. | 705/2 |
| 2007/0282951 A1 | 12/2007 | Selimis et al. | |
| 2008/0005359 A1* | 1/2008 | Khosravi et al. | 709/250 |
| 2008/0010665 A1 | 1/2008 | Hinton et al. | |
| 2008/0126794 A1* | 5/2008 | Wang et al. | 713/151 |
| 2008/0155647 A1 | 6/2008 | Miyawaki et al. | |
| 2008/0209028 A1* | 8/2008 | Kurup et al. | 709/224 |
| 2008/0235755 A1 | 9/2008 | Blaisdell et al. | |
| 2008/0276311 A1 | 11/2008 | Kassovic | |
| 2009/0150343 A1 | 6/2009 | English et al. | |
| 2009/0157708 A1* | 6/2009 | Bandini et al. | 707/100 |
| 2009/0182843 A1 | 7/2009 | Hluchyj et al. | |
| 2009/0249438 A1 | 10/2009 | Litvin et al. | |
| 2009/0271453 A1 | 10/2009 | Ben-Natan | |
| 2009/0328187 A1 | 12/2009 | Meisel | |
| 2010/0241688 A1 | 9/2010 | Hazlewood et al. | |
| 2010/0325357 A1 | 12/2010 | Reddy et al. | |
| 2011/0055916 A1 | 3/2011 | Ahn | |
| 2011/0231510 A1 | 9/2011 | Korsunsky et al. | |
| 2012/0030730 A1* | 2/2012 | Smith et al. | 726/2 |
| 2012/0117222 A1 | 5/2012 | Holloway et al. | |
| 2012/0278886 A1* | 11/2012 | Luna | 726/22 |
| 2012/0324569 A1* | 12/2012 | Diehl et al. | 726/14 |
| 2013/0007839 A1 | 1/2013 | Mao et al. | |
| 2013/0036152 A1* | 2/2013 | Goyal et al. | 709/201 |
| 2013/0067596 A1 | 3/2013 | Siourthas et al. | |
| 2013/0227142 A1* | 8/2013 | Frumkin et al. | 709/226 |
| 2013/0298221 A1 | 11/2013 | Smith et al. | |
| 2013/0312054 A1* | 11/2013 | Wang et al. | 726/1 |
| 2014/0075497 A1* | 3/2014 | Luo et al. | 726/1 |
| 2014/0082204 A1* | 3/2014 | Shankar et al. | 709/227 |
| 2014/0090014 A1 | 3/2014 | Crawford | |
| 2014/0095711 A1* | 4/2014 | Kim et al. | 709/224 |
| 2014/0123266 A1 | 5/2014 | Carbou et al. | |
| 2014/0201528 A1* | 7/2014 | Krig et al. | 713/168 |
| 2015/0040232 A1* | 2/2015 | Oliphant et al. | 726/25 |

OTHER PUBLICATIONS

Jeffrey, et al., "Model Checking Firewall Policy Configurations," IEEE International Symposium on Policy for Distributed Systems and Networks, 2009, pp. 60-67.

Al-Shaer, et al., "Network Configuration in a Box: Towards End-to-End Verification of Network Reachability and Security," IEEE ICNP, 2009, pp. 123-132.

Paul, et al., "Design and Implementation of Packet Filter Firewall using Binary Decision Diagram," Proceeding of the 2011 IEEE Students' Technology Symposium, Jan. 14-16, 2011, pp. 17-22.

Smaldone, S.; Bohra, A.; Iftode, L., "FileWall: A Firewall for Network File Systems," Sep. 25-26, 2007, Dependable, Autonomic and Secure Computing, 2007. DASC 2007. Third IEEE International Symposium, pp. 153, 162.

Samak, T.; El-Atawy, A.; Al-Shaer, E., "FireCracker: A Framework for Inferring Firewall Policies using Smart Probing," Oct. 16-19, 2007, Network Protocols, 2007. ICNP 2007. IEEE International Conference, pp. 294,303.

Hamed, H.; El-Atawy, A.; Al-Shaer, E., "Adaptive Statistical Optimization Techniques for Firewall Packet Filtering," Apr. 12, 2006, INFOCOM 2006. 25th IEEE International Conference on Computer Communications. Proceedings, pp. 1.

* cited by examiner

EARLY POLICY EVALUATION OF MULTIPHASE ATTRIBUTES IN HIGH-PERFORMANCE FIREWALLS

CROSS REFERENCE TO RELATED APPLICATIONS

This application is a continuation of U.S. patent application Ser. No. 13/613,829, filed Sep. 13, 2012, entitled "Early Policy Evaluation of Multiphase Attributes in High-Performance Firewalls," the entire contents of which are hereby incorporated by reference.

TECHNICAL FIELD

The present disclosure relates to firewall and proxy devices. Specifically, it relates to the evaluation of policies that are conditional on attributes whose values may become known in different phases of network traffic analysis.

BACKGROUND

In firewall and proxy products, a policy is composed of a set of conditions which, when evaluated against network traffic, cause the proxy device to apply a policy decision, such as allowing or denying the traffic. Generally, the conditions are based on an attribute of the network traffic such as an application associated with the traffic, the IP address of the client device, the IP address of the server device, the reputation of the server, the names of the client and server devices, etc.

To evaluate traffic between a client device and a server device, the proxy will intercept the communications between the client and server. The intercepted communications are examined by the proxy to determine whether any policy should be applied to the traffic. If it is determined that the traffic should not be blocked, the proxy may cease analyzing the traffic, and allow the client and server to communicate without further delays. Alternatively, if a policy is applied, the proxy may block that traffic or take other actions, as prescribed by the policy.

DESCRIPTION OF EXAMPLE EMBODIMENTS

Overview

According to the techniques described herein, a policy is established comprising a condition having a multiphase attribute of a multiphase transaction. Phase specific policies are established for each phase in which the multiphase attribute may become known. The multiphase transaction is evaluated according to the phase specific policies at each phase of the multiphase transaction in which the multiphase attribute may become known until a policy decision of the policy is determined.

Example Embodiments

Figure 1:
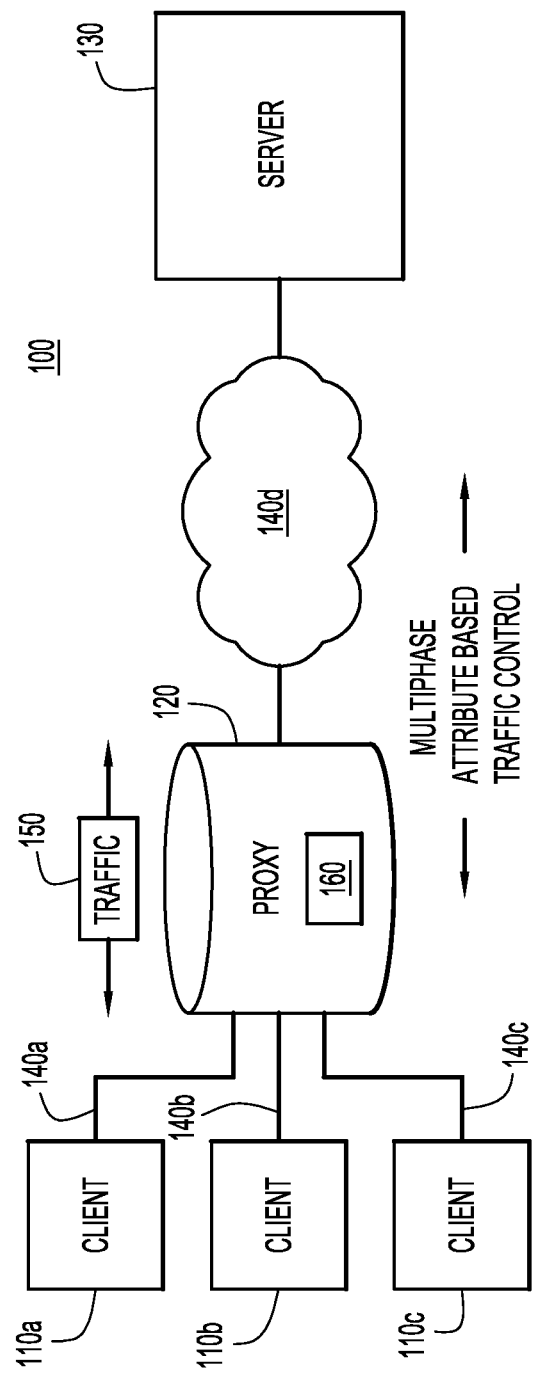
FIG. 1 illustrates an example computer network in which a proxy device is configured for early policy evaluation of multiphase attributes.

Depicted in FIG. 1 is a network environment 100 comprising clients 110a-c, proxy or firewall 120, server 130, and network 140. The network may comprise local network components 140a-c, as well as the Internet 140d. Network traffic 150 is sent between clients 110a-d and server 130 across the network 140. The traffic 150 may be sent according to network protocols such as the Transmission Control Protocol and the Internet Protocol (TCPIP) and others. Proxy 120 intercepts network traffic 150 and applies policy decisions to the traffic to, for example, allow or deny the traffic. According to the example of FIG. 1, proxy 120 applies multiphase attribute-based controls or policies to the traffic based upon multiphase attribute based traffic control logic 160.

Figure 2:
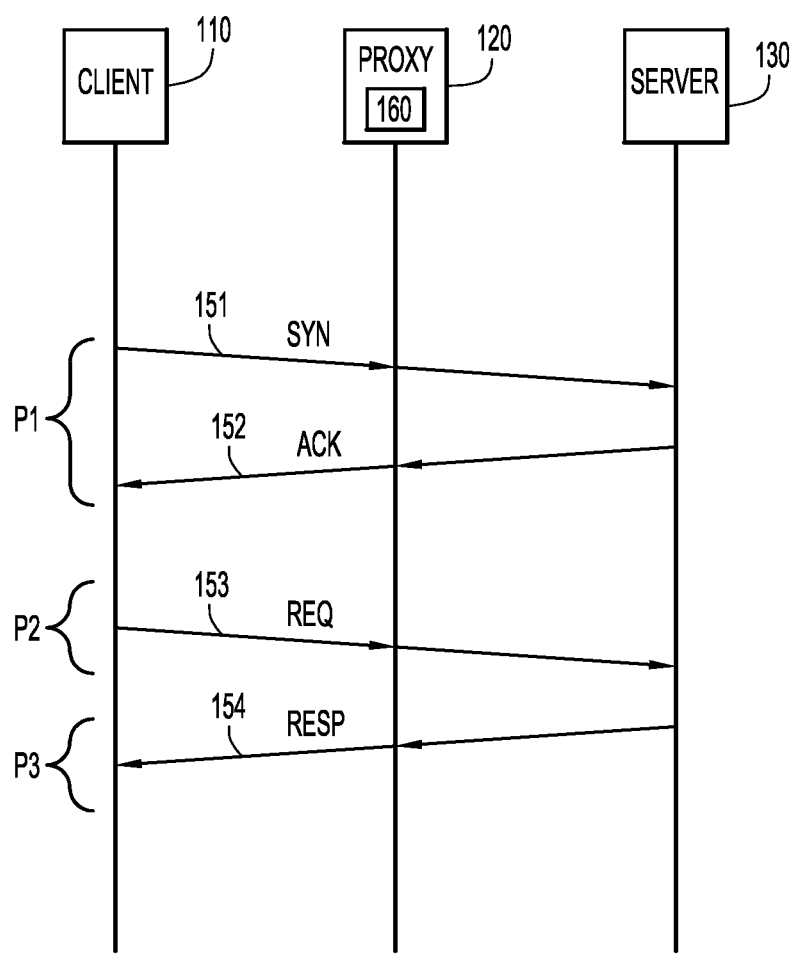
FIG. 2 is a ladder diagram that illustrates an example message exchange between a client and a server through the proxy device FIG. 3

As used herein, a "multiphase transaction" refers to a network transaction comprising different stages during which attributes or values of the transaction may become known. For example, FIG. 2 depicts a ladder diagram illustrating an example multiphase transaction 200 between client 110 and server 130. The communications 151-154 are intercepted by proxy 120, which applies the multiphase attribute based traffic control logic 160 to the transaction 200. The transaction 200 includes three phases, P1, P2 and P3. The first phase P1 results in the establishment of a connection between the client 110 and the server 130. The second phase P2 is a request from the client 110 to the server 130, and the third phase P3 is the server response to the client request.

In addition to the phases illustrated in FIG. 2, additional phases can be portions of individual flows, or messages. For example, additional phases of an HTTP message may include the Request Header, the Request Body, the Response Header and the Response Body.

Although some attributes will always become known to the proxy at a specific time, there are other attributes whose values can become available at different time slots, depending on the traffic and context in which the proxy is evaluating the traffic. These attributes are known as multiphase attributes.

A "multiphase attribute" as used herein refers to an attribute that may become known during one of a plurality of phases of a transaction, though the exact phase may not be known until the transaction takes place. For example, transaction 200 may comprise network traffic associated with a specific type of web-based application such as social network games. The web-based application type attribute of the transaction may be a multiphase attribute. Accordingly, the value of the web application type attribute may become known during any of the three phases, P1, P2 or P3. Yet, until the actual transaction takes place, it may not be known in which of the three phases the proxy will be able to identify the value of the web-based application type attribute. Because the value of the web application type attribute may first become known in any of phases P1, P2 and P3, it is considered a multiphase attribute. On the other hand, another attribute such as the IP address of the client is always known in phase P1, and therefore the IP address of the client would be a single phase attribute.

A "multiphase policy" refers to a policy that is dependent on the value of a multiphase attribute. Accordingly, a policy being applied by the proxy 120 may be dependent upon the web application type attribute. If the web application type attribute is a multiphase attribute, then policies that test the value of this attribute are multiphase policies. If the web application type attribute of the transaction is "social network games," the policy decision applied by the proxy 120 may be to block the traffic.

The traditional proxy devices cannot efficiently evaluate multiphase attributes as the proxy must wait until the final phase to ensure that the attribute's value is available before any evaluation on the corresponding conditions can be performed. In contrast, the multiphase attribute based traffic control logic 160 allows the proxy to perform multiphase traffic control as described in more detail with references to FIGS. 3-5, below.

Figure 3:
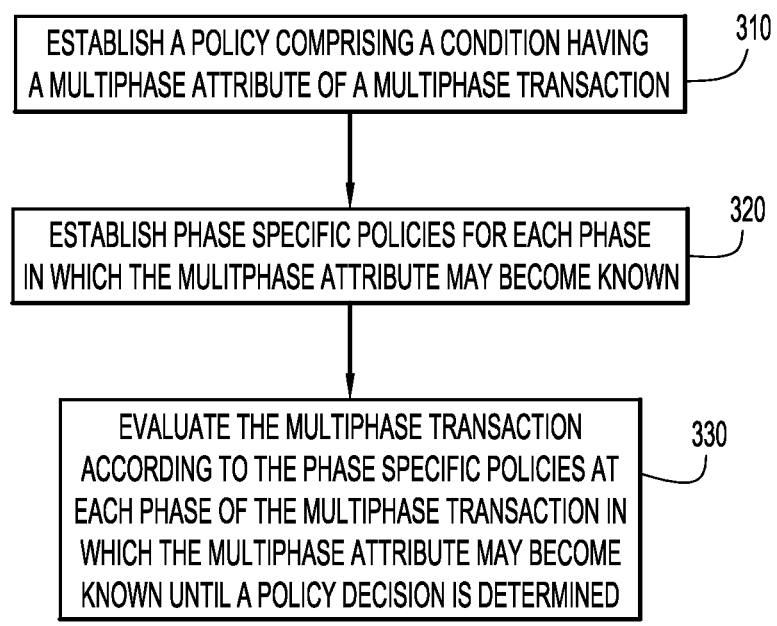
FIG. 3 is a flow chart that illustrates example operations performed at the proxy device for early evaluation of a policy comprising a condition evaluating a multiphase attribute.

Reference is now made to FIG. 3. Depicted in FIG. 3 is a flow chart 300 illustrating a method of applying a policy comprising a condition evaluating a multiphase attribute. The method begins in 310 where a policy comprising a condition having a multiphase attribute is established for a multiphase transaction. The policy may be determined by an administrator and entered into the proxy through administration software. Alternatively, the policies may be automatically determined by the proxy, or automatically populated in the proxy according to the specific implementation. The policy may read "if the web application type is 'social network games' then deny the traffic." According to this example, the condition evaluating the multiphase attribute is "the web application type is 'social network games.'"

In 320, phase specific policies for the multiphase condition are determined for each phase in which the multiphase attribute may become known. The phase specific policies may be established by combining a phase specific condition with the condition evaluating the multiphase attribute. According to the example discussed above, the phase specific conditions for the "if the web application type is 'social network games' then deny the traffic," policy would be as follows:

Phase Specific Condition 1="the web application attribute is finalized in phase P1"

Phase Specific Condition 2="the web application attribute is finalized in phase P2"

Phase Specific Condition 3="the web application attribute is finalized in phase P3"

Accordingly, the phase specific policies would be as follows:

Phase Specific Policy 1="If the web application attribute is finalized in phase P1 and the web application type is 'social network games' then deny the traffic."

Phase Specific Policy 2="the web application attribute is finalized in phase P2 and the web application type is 'social network games' then deny the traffic."

Phase Specific Policy 3="If the web application attribute is finalized in phase P3 and the web application type is 'social network games' then deny the traffic."

Finally, in 330, the multiphase attribute is evaluated according to the phase specific policies at each phase of the multiphase transaction in which the multiphase attribute may become known until a policy decision is determined. Accordingly, each of Phase Specific Policy 1, Phase Specific Policy 2 and Phase Specific Policy 3 will be evaluated at each phase of the transaction until a policy decision is determined. Alternatively, evaluating the phase specific conditions at each phase of the multiphase transaction may comprise evaluating Phase Specific Policy 1 at P1, Phase Specific Policy 2 at P2, and Phase Specific Policy 3 at P3 until a policy decision is reached at one of the three phases. Of course, in the event the web application type attribute for the transaction does not have a value of "social network games," the conditions will be evaluated for the different phases, but no decision to block the traffic will be made.

Figure 4:
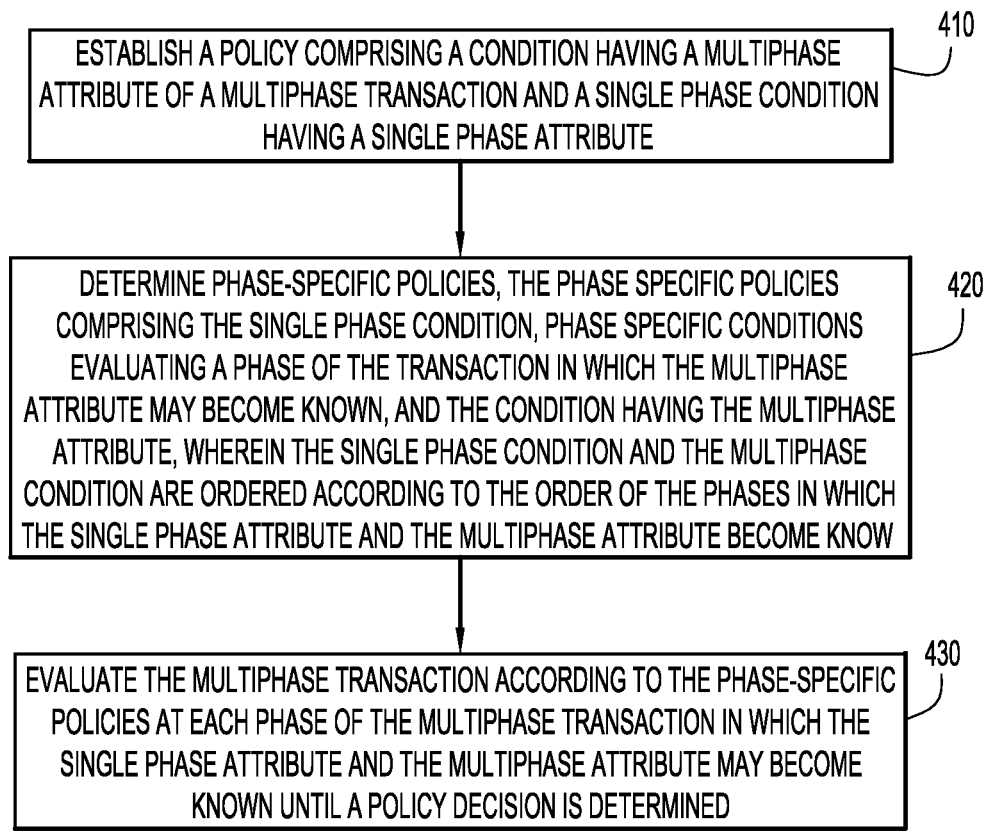
FIG. 4 is a flow chart that illustrates example operations performed at the proxy device for early evaluation of a policy comprising a condition evaluating a multiphase attribute and a condition evaluating a single phase attribute.

Turning now to FIG. 4, depicted therein is a flowchart illustrating a method 400 for applying a policy comprising conditions having both multiphase and single phase attributes. Beginning at 410, a policy is established comprising a condition having a multiphase attribute and a condition having a single phase attribute. Of course, the policy may have additional conditions evaluating multiphase and single phase attributes. For example, the policy may comprise three conditions and read as, "If Condition 1 AND Condition 2 AND Condition 3 Then Deny the Traffic." As an example, the three conditions may be:

Condition 1=source IP address is on "My Internal Network."

Condition 2=requested hostname is NOT "My Cloud Service Hosts" and

Condition 3=web application type is "Social Network Games."

The source IP address attribute becomes known while establishing the connection between the client and the server, and therefore, always becomes known during phase P1. The requested hostname attribute of Condition 2, on the other hand, becomes known when the client sends a request to the server, and therefore, always becomes known during phase P2. Accordingly, Condition 1 and Condition 2 are single phase conditions. As with the prior example, the web application type attribute of Condition 3 may become known during phases P1, P2, or P3. Accordingly, Condition 3 is a multiphase condition.

At 420, phase specific policies are determined for the policy. According to the present example, the phase specific policies are constructed by combining the single phase condition, phase specific conditions, and the condition evaluating the multiphase attribute in the order in which the attributes of the condition may become known.

A phase specific condition as used in this example is a condition that evaluates whether an attribute becomes known in a specific phase. Accordingly, the phase specific conditions for the "the web application type is 'social network games' then deny the traffic," policy would be as follows:

Phase Specific Condition 1="the web application attribute becomes known in phase P1"

Phase Specific Condition 2="the web application attribute becomes known in phase P2"

Phase Specific Condition 3="the web application attribute becomes known in phase P3"

Because the present example has one multiphase condition, and three phase specific conditions, three phase specific policies will be constructed. Using these phase specific conditions, the phase specific policies will be as follows:

Phase Specific Policy 1=IF Condition 1 AND (Phase Specific Condition 1 AND Condition 3) AND Condition 2 THEN Deny Traffic Phase Specific Policy 2=IF Condition 1 AND Condition 2 AND (Phase Specific Condition 2 and Condition 3) THEN Deny Traffic.

Phase Specific Policy 3=IF Condition 1 AND Condition 2 AND (Phase Specific Condition 3 AND Condition 3) THEN Deny Traffic.

As indicated above, the phase specific policies are arranged in the order in which the attributes will be evaluated. It may further be the case that single phase conditions will always be evaluated prior to multiphase conditions and phase specific conditions which may become known during the same phase.

For example, in Phase Specific Policy 1, even though Condition 1 and Condition 3 may both become known during phase P1, Condition 1 is evaluated first because it is a single phase condition and will definitely become known during phase P1.

Finally, at 430 the multiphase transaction is evaluated according to the phase specific policies at each phase of the multiphase transaction in which the single phase attribute and/or the multiphase attribute may become known.

Figure 5:
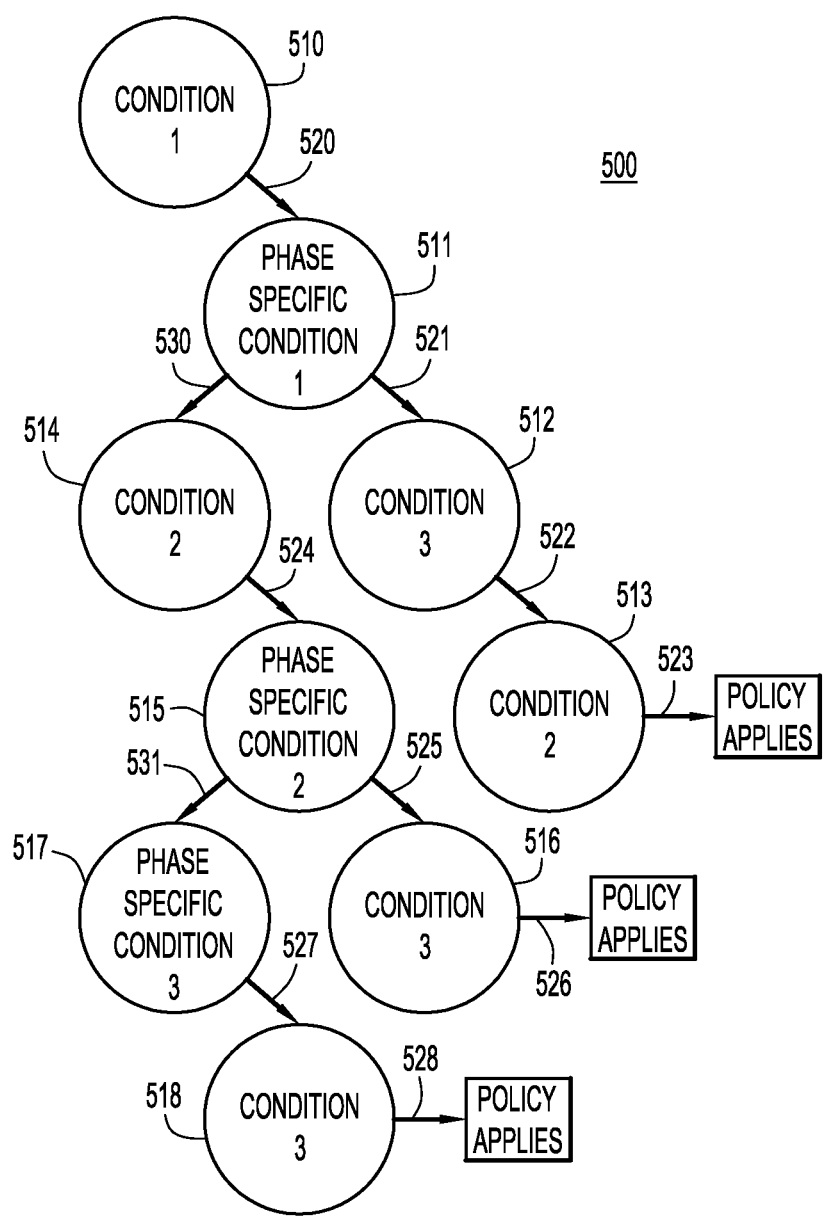
FIG. 5 illustrates an example decision tree for early policy evaluation of multiphase attributes.

With reference now made to FIG. 5, depicted therein is a decision tree constructed according to the phase specific polices. In order to evaluate the multiphase transaction, a data structure may be constructed according to the phase specific policies. One such data structure is depicted in decision tree 500, though other data structures may be used such as binary and ternary decision diagrams. The arrows projecting from each node 510-518 of the decision tree 500 indicate whether or not the condition has been met. For example, arrows 520-528 which point down and to the right indicate the condition of the node from which the arrow originates has been met. On the other hand, arrows 530-531 which point down and to the left indicate that the condition of the node from which the arrow originates has not been met. Similarly, for nodes 510, 514, 517 and 518, which have no arrow pointing to the left, if the condition of the node is not met, evaluation of the nodes and conditions terminates for that phase of the transaction.

The nodes are arranged according to the phase specific policies. Specifically, the right-most most path through the decision tree that will result in the policy being applied comprises nodes 510-513 which include the conditions of Phase Specific Policy 1, mainly Condition 1, Phase Specific Condition 1, Condition 3 and Condition 2. The center path through the decision tree 500 comprising nodes 510, 514, 515 and 516 includes the conditions of Phase Specific Policy 2. Finally, the left most path through the decision tree comprising nodes 510, 514, 517 and 518 includes the conditions of Phase Specific Policy 3.

Once constructed, the decision tree 500 may be used to evaluate a transaction during each phase of the transaction. According to a first example, if the transaction has just completed phase P1, and the web application attribute becomes known in phase P1, the decision tree 500 may be used to evaluate the transaction as follows. At node 510, Condition 1 is evaluated and, it is determined whether or not the source IP address is "My Internal Network." If the source IP address is not "My Internal Network," the traffic will be allowed. On the other hand, if the source IP address is "My Internal Network," the processing follows arrow 520 to node 511, and Phase Specific Condition 1 is evaluated.

According to the first example, the web application attribute becomes known during phase P1, and therefore, arrow 521 is followed to node 512 where Condition 3 is evaluated. If the web application type is not "Social Network Games," the evaluation of the transaction stops as there is no left hand arrow off of node 512. On the other hand, if the web application type is "Social Network Games," arrow 522 will be followed to node 513 and condition 2 is evaluated.

According to the first example, in which the evaluation is taking place after phase P1, but before phase P2, processing will stop at node 513 because Condition 2, which evaluates if requested hostname attribute is NOT "My Cloud Service Hosts" can only be determined after completion of phase P2.

According to a second example, if the transaction has just completed phase P2, and the web application attribute becomes know in phase P2, the decision tree 500 may be used to evaluate the transaction as follows. At node 510, Condition 1 is evaluated and, it is determined whether or not the source IP address is "My Internal Network." If the source IP address is not "My Internal Network," processing of phase P1 is completed. On the other hand, if the source IP address is "My Internal Network," arrow 520 is followed to node 511, and Phase Specific Condition 1 is evaluated.

As indicated above, according to this second example, the web application attribute becomes known at phase P2, and not phase P1. Accordingly, node 511 is evaluated as false, and the processing follows arrow 530 to node 514. At node 514, Condition 2 is evaluated. If the requested hostname is "My Cloud Service," then the traffic is allowed. Alternatively, if it is determined that requested hostname is NOT "My Cloud Service Hosts" the processing follows arrow 524 to node 515. In node 515 Phase Specific Condition 2 is evaluated. According to the present example, the web application attribute became available during phase P2. Accordingly, the processing will follow arrow 525 to node 516. At node 516 it is determined whether the web application type attribute is "Social Network Games." If it is determined that the web application type attribute is "Social Network Games," the policy applies and the traffic is blocked. Alternatively, if the web application type is not "Social Network Games," the evaluation of the transaction will be completed and the traffic will be allowed.

According to a third example, the transaction is evaluated after phase P3, and the web application type attribute becomes known in phase P3. Accordingly, the processing will follow the same path as it did in the second example until node 515 is reached. At node 515 arrow 531 is followed because the web application type attribute does not become known until phase P3. At node 517 arrow 18 will be followed because, according to the present example, the web application type attribute became known in phase P3. Finally, at node 518, if the web application type attribute is "Social Network Games," the processing will follow arrow 528 and the traffic will be blocked. If the web application type attribute is not "Social Network Games," the processing will complete and the traffic will be allowed.

While the examples described above describe a single multiphase condition, the techniques taught herein may be applied to situations in which the policy to be applied to the traffic includes a plurality of multiphase conditions. Accordingly, phase specific policies comprising phase specific conditions for each of the plurality of multiphase conditions would be established, and a decision tree may be constructed accordingly.

The techniques described herein may provide numerous benefits over other methods of evaluating multiphase transactions. For example, if the proxy device does not create phase specific policies, the original policy may be evaluated in the order in which the conditions are listed. Consider the example policy "If Condition 1 AND Condition 2 AND Condition 3 Then Deny the Traffic," where Condition 1 is a multiphase attribute which may become known in phase P1, P2 or P3, while Condition 2 always becomes known in phase P1, and Condition 3 always becomes known on phase P2. If the conditions are evaluated in the order listed, it will be necessary to evaluate Condition 1 before Conditions 2 and 3. This may result in the traffic being unnecessarily delayed. For example, if Condition 1 becomes known in phase P3, the decision to allow the traffic will always be delayed until phase P3 even if Condition 2 indicates the traffic should be allowed at phase P1.

Figure 6:
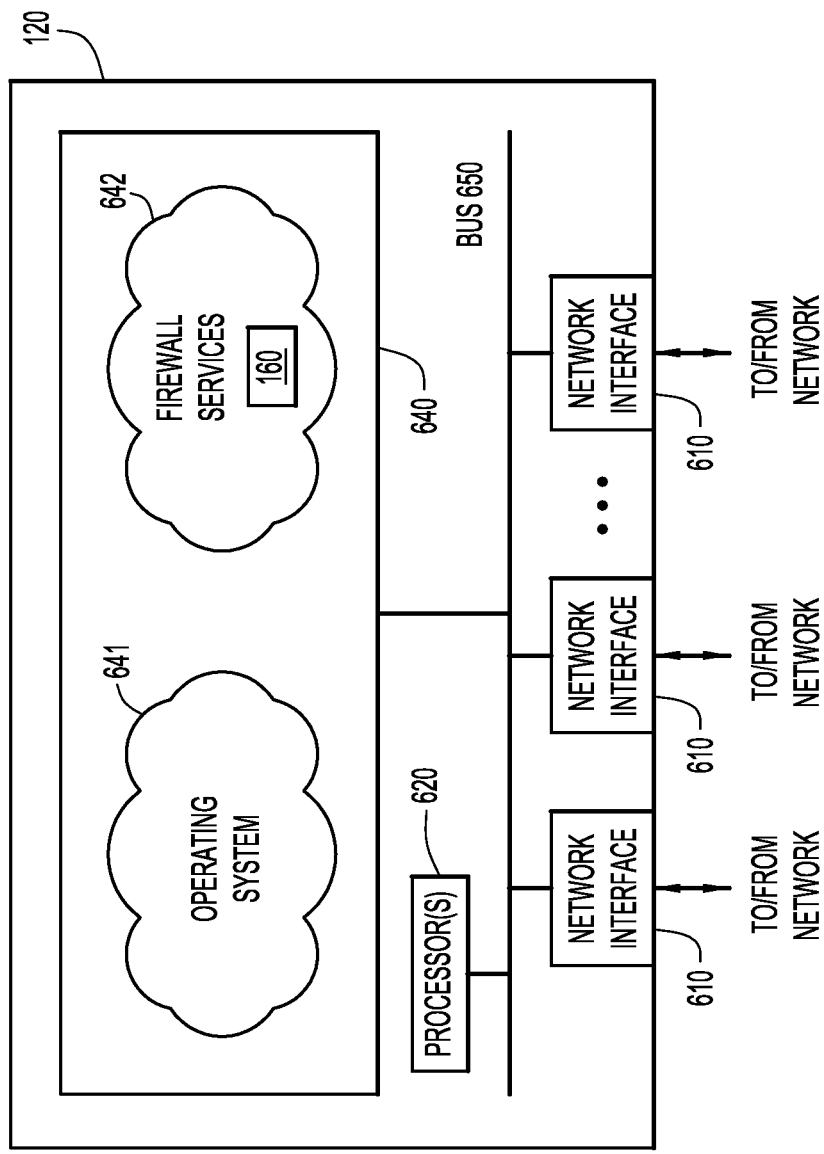
FIG. 6 illustrates an example proxy device configured for early policy evaluation of multiphase attributes.

FIG. 6 depicts an example block diagram of a proxy device 120 configured to perform the traffic control techniques described herein. The proxy device 120 comprises network interfaces 610, processor 620, bus 630, and memory 640. The memory 640 comprises software instructions for operating system 641, firewall services 642.

Memory 640 may comprise read only memory (ROM), random access memory (RAM), magnetic disk storage media devices, optical storage media devices, flash memory devices, electrical, optical, or other physical/tangible (e.g., non-transitory) memory storage devices. The processor 620 is, for example, a microprocessor or microcontroller that executes instructions for the proxy device logic. Thus, in general, the memory 640 may comprise one or more tangible (non-transitory) computer readable storage media (e.g., a memory device) encoded with software comprising computer executable instructions for firewall services 642, such as multiphase attribute based traffic control logic 160. When the firewall services are executed (by the processor 620), and in particular the multiphase attribute based traffic control logic 160, it is operable to perform the operations described herein in connection with FIGS. 2-5.

Specifically, the processor may establish a policy, the policy comprising a condition having a multiphase attribute of a multiphase transaction. According to the phases of the multiphase transaction, the processor may establish phase specific policies for each phase in which the multiphase attribute may become known. With the phase specific policies in place, the processor may evaluate the multiphase transaction according to the phase specific policies at each phase of the multiphase transaction in which the multiphase attribute may become known until a policy decision of the policy is determined.

In order to establish the phase specific policies, the processor may establish phase specific conditions each evaluating a phase of the transaction in which the multiphase attribute may become known.

If the initial policy comprises multiphase and single phase attributes, the processor establishes the phase specific policies by ordering the phase specific conditions, the multiphase conditions and the single-phase condition according to the order of the phases in which the single phase attribute and the multiphase attribute become known.

Finally, the processor may construct a data structure according to the phase specific policies, and determine the policy decision from the data structure as, for example, described above with regard to FIG. 5. The data structure may be, for example, a decision tree, a binary decision diagram or a ternary decision diagram.

In computer readable tangible storage media form, instructions are encoded on a computer readable tangible storage media that, when executed by a processor, cause the processor to establish a policy, the policy comprising a condition having a multiphase attribute of a multiphase transaction. The processor determines phase specific policies of the conditions for phases in which the multiphase attribute may become known. After determining the phase specific policies, the processor evaluates the multiphase transaction according to the phase specific policies at each phase of the multiphase transaction in which the multiphase attribute may become known until a policy decision of the policy is determined.

The above description is intended by way of example only.

What is claimed is:

1. A method comprising:
    establishing a policy at a network device, the policy comprising a multiphase condition having a multiphase attribute of a multiphase transaction, wherein the multiphase attribute comprises an attribute that becomes known at one or more of a plurality of phases of the multiphase transaction, and the multiphase condition comprises a condition that is met at one or more of the plurality of phases;
    establishing phase specific policies for each phase of the plurality of phases in which the multiphase attribute becomes known, wherein the phase specific policies include phase specific conditions which correspond to phases of the plurality of phases in which the multiphase attribute becomes known, wherein establishing the phase specific policies comprises ordering the phase specific conditions according to an order of the plurality of phases in which the multiphase attribute becomes known;
    evaluating the multiphase transaction at the network device according to the phase specific policies until a policy decision of the policy is determined, the policy decision including a decision to either allow or deny traffic, and applying the policy to the traffic.

2. The method of claim 1, wherein establishing the phase specific policies comprises ordering the phase specific conditions and multiphase condition according to the phases of the transaction.

3. The method of claim 2, wherein the policy further comprises a single phase condition having a single phase attribute, and wherein establishing the phase specific policies comprises including the single phase condition in each phase specific policy and ordering the phase specific conditions, the multiphase condition and the single phase condition according to an order of the plurality of phases in which the multiphase attribute becomes known and a phase in which the single phase attribute becomes known.

4. The method of claim 1, wherein evaluating comprises constructing a data structure according to the phase specific policies, and determining the policy decision from the data structure.

5. The method of claim 4, wherein constructing the data structure comprises constructing a decision tree.

6. The method of claim 4, wherein constructing the data structure comprises constructing one of a binary decision diagram or a ternary decision diagram.

7. The method of claim 1, wherein the phases of the multiphase transaction comprise messages sent according to a network communication protocol.

8. An apparatus comprising:
    a memory;
    a network interface unit configured to enable network communications; and
    a processor coupled to the memory and the network interface unit, wherein the processor is configured to:
        establish a policy comprising a multiphase condition having a multiphase attribute of a multiphase transaction, wherein the multiphase attribute comprises an attribute that becomes known at one or more of a plurality of phases of the multiphase transaction, and the multiphase condition comprises a condition that is met at one or more of the plurality of phases;
        establish phase specific policies for each phase of the plurality of phases in which the multiphase attribute becomes known, wherein the phase specific policies include phase specific conditions which correspond to phases of the plurality of phases in which the multiphase attribute becomes known, wherein the processor establishes the phase specific policies by ordering the phase specific conditions according to an order of the plurality of phases in which the multiphase attribute becomes known;

evaluate the multiphase transaction according to the phase specific policies until a policy decision of the policy is determined, the policy decision including a decision to either allow or deny traffic, and apply the policy to the traffic.

9. The apparatus of claim 8, wherein the processor is further configured to establish the phase specific policies by ordering the phase specific conditions and multiphase condition according to the phases of the transaction.

10. The apparatus of claim 9, wherein the policy further comprises a single phase condition having a single phase attribute, and the processor is further configured to establish the phase specific policies by including the single phase condition in each phase specific policy and order the phase specific conditions, the multiphase condition and the single phase condition according to an order of the plurality of phases in which the multiphase attribute becomes known and a phase in which the single phase attribute becomes known.

11. The apparatus of claim 8, wherein the processor is further configured to evaluate the multiphase transaction by constructing a data structure according to the phase specific policies, and determining the policy decision from the data structure.

12. The apparatus of claim 11, wherein the processor is configured to construct the data structure by constructing a decision tree.

13. The apparatus of claim 11, wherein the processor is configured to construct the data structure by constructing one of a binary decision diagram or a ternary decision diagram.

14. The apparatus of claim 8, wherein the phases of the multiphase transaction comprise messages sent according to a network communication protocol.

15. A non-transitory computer readable tangible storage media encoded with instructions that, when executed by a processor, cause the processor to:

establish a policy comprising a multiphase condition having a multiphase attribute of a multiphase transaction, wherein the multiphase attribute comprises an attribute that becomes known at one or more of a plurality of phases of the multiphase transaction, and the multiphase condition comprises a condition that is met at one or more of the plurality of phases;

establish phase specific policies for each phase of the plurality of phases in which the multiphase attribute becomes known, wherein the phase specific policies include phase specific conditions which correspond to phases of the plurality of phases in which the multiphase attribute becomes known, and wherein the instructions cause the processor to establish the phase specific policies by ordering the phase specific conditions according to an order of the plurality of phases in which the multiphase attribute becomes known;

evaluate the multiphase transaction according to the phase specific policies until a policy decision of the policy is determined, the policy decision including a decision to either allow or deny traffic, and apply the policy to the traffic.

16. The computer readable storage media of claim 15, wherein the instructions cause the processor to establish the phase specific policies by ordering the phase specific conditions and multiphase condition according to the phases of the transaction.

17. The computer readable storage media of claim 16, wherein the policy further comprises a single phase condition having a single phase attribute, and wherein the instructions cause the processor to establish the phase specific policies by including the single phase condition in each phase specific policy and ordering the phase specific conditions, the multiphase condition and the single phase condition according to an order of the plurality of phases in which the multiphase attribute becomes known and a phase in which the single phase attribute becomes known.

18. The computer readable storage media of claim 15, wherein the instructions cause the processor to evaluate the multiphase transaction by constructing a data structure according to the phase specific policies, and determining the policy decision from the data structure.

19. The computer readable storage media of claim 18, wherein the instructions cause the processor to construct the data structure by constructing one of a decision tree, a binary decision diagram or a ternary decision diagram.

20. The computer readable storage media of claim 15, wherein the phases of the multiphase transaction comprise messages sent according to a network communication protocol.

* * * * *